United States Patent
Brunner

(10) Patent No.: US 11,639,034 B2
(45) Date of Patent: May 2, 2023

(54) ELECTROFUSION TAPE

(71) Applicant: Georg Fischer Rohrleitungssysteme AG, Schaffhausen (CH)

(72) Inventor: Andreas Brunner, Benken (CH)

(73) Assignee: Georg Fischer Rohrleitungssysteme AG, Schaffhausen (CH)

( * ) Notice: Subject to any disclaimer, the term of this patent is extended or adjusted under 35 U.S.C. 154(b) by 1007 days.

(21) Appl. No.: 16/399,042

(22) Filed: Apr. 30, 2019

(65) Prior Publication Data
US 2019/0366648 A1 Dec. 5, 2019

(30) Foreign Application Priority Data

May 29, 2018 (EP) ..................................... 18174699

(51) Int. Cl.
*F16L 47/03* (2006.01)
*B29C 65/34* (2006.01)
*B29C 65/50* (2006.01)

(52) U.S. Cl.
CPC ...... *B29C 65/3468* (2013.01); *B29C 65/3432* (2013.01); *B29C 65/3476* (2013.01); *B29C 65/3488* (2013.01); *B29C 65/3492* (2013.01); *B29C 65/5071* (2013.01); *F16L 47/03* (2013.01)

(58) Field of Classification Search
CPC .. F16L 47/03; B29C 65/3468; B29C 65/3472; B29C 65/3488; B29C 65/342; B29C 65/3432
See application file for complete search history.

(56) References Cited

U.S. PATENT DOCUMENTS

| | | | |
|---|---|---|---|
| 4,378,323 A | | 3/1983 | Brandeau |
| 4,675,512 A | * | 6/1987 | Doucet ............... B29C 61/0625 219/535 |
| 5,236,765 A | * | 8/1993 | Cordia ............... B29C 65/3428 219/535 |
| 5,286,952 A | | 2/1994 | McMills et al. |
| 6,059,319 A | * | 5/2000 | Wyke .................. B29C 65/3452 219/535 |
| 6,316,751 B1 | * | 11/2001 | Wyke .................. B29C 65/3452 219/535 |

(Continued)

FOREIGN PATENT DOCUMENTS

| | | |
|---|---|---|
| BE | 1005527 A3 | 9/1993 |
| EP | 0 414 641 A1 | 2/1991 |
| EP | 0 430 866 A2 | 6/1991 |

*Primary Examiner* — David Bochna
(74) *Attorney, Agent, or Firm* — Harness, Dickey & Pierce, P.L.C.

(57) ABSTRACT

Electrofusion tape and method for the production thereof for welding together with plastics pipes in particular for use in a fixed-point fastening, consisting of a jacket element preferably of an electrically insulating plastics material, at least one heating element of electrically conductive plastics material and at least two contact elements for supplying electricity to the heating element, wherein the jacket element and the heating element take the form of tapes, wherein the jacket element surrounds the heating element at least in part, wherein the contact elements are arranged in the mutually opposing marginal regions of the heating element and extend parallel to one another along the heating element.

13 Claims, 3 Drawing Sheets

(56) References Cited

U.S. PATENT DOCUMENTS

| | | | |
|---|---|---|---|
| 2012/0273474 A1* | 11/2012 | Joo | B29C 65/3428 |
| | | | 521/134 |
| 2013/0133829 A1* | 5/2013 | Pinder | B29C 65/3468 |
| | | | 285/21.2 |
| 2021/0121975 A1* | 4/2021 | Conrad | B29C 65/348 |

* cited by examiner

ELECTROFUSION TAPE

CROSS-REFERENCE TO RELATED APPLICATIONS

This application claims the benefit and priority of European Patent Application No. 18 174 699.1 filed May 29, 2018. The entire disclosure of the above application is incorporated herein by reference.

FIELD OF THE INVENTION

The invention relates to an electrofusion tape for welding together with plastics pipes in particular for use in a fixed-point fastening, consisting of a jacket element preferably of an electrically insulating plastics material, at least one heating element of electrically conductive plastics material and at least two contact elements for supplying electricity to the heating element.

BACKGROUND OF THE INVENTION

Such electrofusion tapes are used in the prior art for example for fixing pipe clamps on a pipe to ensure against displacement in axial directions. For the most part, fixed-point fastenings or fixed-points are used for this purpose and are generally known with regard to laying or fastening pipe systems. With such fixed-point fastenings, axial movements in plastics pipes are controlled or prevented. Fixed-point fastenings subdivide the plastics pipes into small portions which have limited freedom of movement. Fixed-point fastenings have in this case to accommodate the forces of longitudinal expansion of the plastics pipes, the weight of the medium flowing therethrough and also the weight of the plastics pipes and any type of force applied by operation and maintenance. According to the prior art, a fixed-point fastening consists of a fixed-point pipe clamp, which engages directly around the pipe itself or a fitting applied to the pipe and which is fastened to a building wall spacedly therefrom by means of a base plate. To prevent axial displacement, limit stops are located on both sides next to the pipe clamp, wherein these limit stops for the most part take the form of welding sleeves or indeed moulded parts.

EP 0 430 866 A2 and EP 0 414 641 A1 disclose a connection piece, which is welded to a plastics pipe and which is then surrounded by a pipe clamp of a fixed-point fastening. The issue of the axial limit stop is solved directly with a fusion tape by arranging lateral beads thereon, wherein the electrofusion tape uses a welding wire for heating thereof.

A disadvantage here is that, in particular with a large-size pipe with a correspondingly large pipe circumference, the electrical voltage needed for welding increases significantly, which is not expedient with regard to occupational safety. Alternatively, welding times are greatly increased at low voltage, which results in additional costs for the installer. In addition, due to the contact points for the power supply, each pipe size has to have a separate connection piece matched to the pipe diameter, resulting in high production and warehousing costs. Furthermore, the structure requires special non-standard pipe clamps of adapted diameter, which in turn results in a parts geometry which lends the product unnecessarily high bending resistance. Moreover, heating by means of a heating element (wire) does not result in uniform heating of the welding zone.

SUMMARY OF THE INVENTION

It is an aspect of the invention to propose an electrofusion tape and a production method associated therewith which allows multipurpose use and is thus applicable for all pipe diameters and is appropriately flexible to allow simple and perfectly fitting mounting, which is in turn of economic benefit and simplifies the production method, it being possible to dispense with the production of diameter-specific parts and produce parts in diameter-independent manner.

This aspect is achieved according to the invention in that the jacket element and the heating element(s) take the form of tapes, wherein the jacket element surrounds the heating element(s) at least in part, wherein the contact elements are arranged in the mutually opposing marginal regions of the heating element(s) and extend parallel to one another along the heating element(s).

The electrofusion tape according to the invention is distinguished in that comparatively low electrical voltages are needed for successful welding irrespective of the length of the electrofusion tape. It is thus also the case that welding times are length-independent and remain comparatively short even for large pipe sizes.

In addition, uniform heating of the heating element is ensured, which fuses the welding zone uniformly and thereby reduces welding times.

For welding together with plastics pipes in particular for use in a fixed-point fastening, the electrofusion tape according to the invention includes a jacket element preferably of an electrically insulating plastics material. Furthermore, the electrofusion tape according to the invention has at least one heating element, which is made from an electrically conductive plastics material. To supply power to the heating element, the electrofusion tape has at least two contact elements. The jacket element and the heating element take the form of tapes, preferably of tapes manufacturable in endless form. The jacket element at least in part surrounds the heating element or the heating element is preferably enclosed by the jacket element in such a way that it is guided at the sides and the top and bottom in form-fitting manner and displacement of the heating element in the jacket element is only possible in the longitudinal direction, wherein, in the case of coextrusion of the jacket and heating elements, displacement in the longitudinal direction is also prevented, since the two elements fuse together in the contact region. The contact elements are arranged in the mutually opposing marginal regions of the heating element and extend along the heating element, which takes the form of a tape. The heating element may be formed of a plurality of heating elements preferably running in parallel, which may each have two contact elements or instead share one contact element between them, three contact elements thus being present for example for two heating elements which run preferably in parallel. The contact elements extend parallel to one another, wherein the current flow between the two contact elements is enabled by the heating element, which consists of an electrically conductive plastics material. Because the heating element consists exclusively of electrically conductive plastics material and there are no wires or stranded wires for guaranteeing current flow between the contact elements, the heating element is flexible and pliable in use.

The specific conductivity of the contact elements is preferably higher than the specific conductivity of the heating element, preferably at least ten times, especially preferably at least one hundred times higher; this enables good power supply and promotes uniform energy input over the entire heating element.

It has proven advantageous for the heating element of electrically conductive plastics material to have a specific electrical resistance of 0.1-100 [Ω×cm], preferably of 0.1-10 [Ω×cm]; this enables uniform heating of the heating element.

The contact elements are preferably made of metal, wherein copper is preferable. It is likewise possible for the contact elements to consist of endless carbon fibre or of an electrically conductive plastics compound with carbon nanotubes, graphite, graphene or with a metallic filler. These materials are well suited to supplying power. In addition to high electrical conductivity, these contact elements may also be simply introduced into the heating element, the contact elements preferably being co-incorporated during the extrusion process.

It has proven advantageous for the contact elements to take the form of wire or wire braid, wherein other configurations are also possible. Various cross-sectional shapes of the contact element, such as for example round, oval, polygonal etc., are also suitable for supplying power.

In the thinner regions of the heating element, the current density or the local voltage drop over the resistance element increases, whereby the heating element becomes warmer or hotter in these regions than in the thicker regions, wherein the width or thickness of the regions depends on the cross-sectional area of the heating element.

In one preferred embodiment, the jacket element and the heating element are manufactured on the basis of the same grade of plastics material, preferably on the basis of a thermoplastic, a thermoplastic polyolefin being especially preferred. In addition, both the jacket element and the heating element preferably comprise the same plastics material and/or are based on the same plastics material as the pipes to which the electrofusion tape is welded.

It is advantageous for the heating element to be arranged form-fittingly in the jacket element, wherein the heating element and the jacket element are preferably arranged so as to be displaceable relative to one another exclusively in the longitudinal direction of the tape. The form-fitting connection between the jacket element and the heating element prevents lateral displacement of the elements relative to one another as well as upwards and downwards. The possibility of relative displacement in the longitudinal direction of the heating element and of the jacket element ensures high flexibility of the electrofusion tape, which may thus be used for all pipe diameters since the electrofusion tape may thereby also be applied around smaller diameters. If the electrofusion tape is produced by coextrusion, the jacket element and the heating element are fused together at the mutually contacting faces, so eliminating longitudinal displacement and thereby slightly impairing the flexibility of the electrofusion tape. However, good pliability is nevertheless ensured due to the thin configuration of the electrofusion tape or of the jacket element and of the heating element. Despite fusion together of the jacket and heating elements, which are made from different plastics materials but preferably based on the same plastics material, in the present invention a plurality of elements is mentioned or reference is made to a plurality of elements such as the jacket element and at least one heating element even if mutual fusion takes place; the electrofusion tape or the jacket element and at least one heating element are thus multipart in nature.

The electrofusion tape preferably has a wraparound guide or is configured as such and the heating element is guided in or by the jacket element, wherein the heating element is gripped around at least in part by the jacket element. With the wraparound guide, the heating element is gripped around at the sides and at the top and bottom by the jacket element, such that no lateral displacement is possible, and nor is any upward or downward displacement. Known wraparound guides are T-slot guides or indeed dovetail guides, wherein other types of wraparound guide are also feasible.

The jacket element surrounds the heating element at least in part, wherein it goes without saying that complete surrounding of the heating element by the jacket element is also conceivable, such that the cross-section of the heating element is completely surrounded, even at the bottom thereof, by the jacket element, displacement in the longitudinal direction being possible here too due to the preferably open end faces in the case of separate extrusion of the jacket and heating elements, in which the elements do not fuse together.

It has proven advantageous for the heating element to be displaceable neither sideways nor transversely of the longitudinal direction of the tape, the heating element preferably being arranged so as to be displaceable in the jacket element solely in the longitudinal direction of the tape.

In the cross-section of the electrofusion tape the width or diameter of a contact element is less than or equal to the thickness of the heating element in the region of the contact surface between contact element and heating element. This means that in the cross-section of the electrofusion tape the width or diameter of the contact element is less than or equal to the thickness of the heating element at the point at which the heating element touches or contacts the contact element.

In one further configuration of the invention, the jacket element and the heating element have a dovetail guide or a T-slot guide or take the form of a dovetail guide or T-slot guide. In this way, the heating element is arranged both at the sides and at the top and bottom in form-fitting manner in the jacket element and displacement of the heating and jacket element is only possible in the longitudinal direction of the tape.

In one preferred embodiment, the heating element has anchors for connection to the jacket element. That is to say, by means of such anchors the heating element is arranged form-fittingly in the jacket element and the anchors prevent it from falling out. Because the electrofusion tape has sufficiently large gaps between anchor and jacket element, there is flexibility of the fusion tape or displaceability between heating element and jacket element here too, so ensuring fitting on different pipe diameters.

When welded together with the pipe, i.e. after fitting of the electrofusion tape on the pipe, the anchors may or may not be co-welded.

An electrofusion tape according to the invention is used, inter alia, in a fixed-point fastening for pipes, wherein the electrofusion tape is preferably manufactured as endless tape and may be cut individually to length and is for example encompassed by a pipe clamp of the fixed-point fastening. Alternatively it may also be encompassed by a simple tape, hook and loop tape or a metal clamp, which serves in fastening the electrofusion tape to the outer diameter of the pipe until welding is performed, wherein the encompassing tape, hook and loop tape or metal clamp is conventionally left on the welded electrofusion tape, but removal of the tape or hook and loop tape would be wholly possible. In such cases of fitting, a fixed-point fastening is arranged axially offset relative to the electrofusion tape by a collar on the pipe or is arranged between two electrofusion tapes in order to fix an axial limit stop in the case of pipe displacement or expansion and thereby limit or even prevent axial displacement. It goes without saying that an endless tape should be understood to mean any tape which does not have to be produced specially for each diameter but rather is produced independently of diameter in pieces of several metres or indeed just one metre and then accordingly separated or cut to the required length directly on fitting of the electrofusion tape.

The thickness of the jacket element is preferably stepped at the outer surface thereof, this stepping serving to limit the admissible longitudinal displacement of the pipe fastened for example to a ceiling. When fastening the pipe clamp of a fixed-point fastening directly around the electrofusion tape, which has been welded together with the pipe and which has a raised portion in the marginal regions, the possibility of displacing the pipe is limited in the longitudinal direction. The pipe clamp thus rests against the higher marginal region and the pipe cannot move any further in the longitudinal direction. A further possible use for the electrofusion tape consists in the possibility of encompassing the electrofusion tape with a tape, hook and loop tape or a metal clamp preferably at the reduced-thickness point of the jacket element and thus the tapered diameter when mounted on the pipe, in order to fasten it to the pipe and then weld them together. After welding the tape, hook and loop tape or the metal clamp may be left on the electrofusion tape or indeed removed. The fixed-point fastening is preferably, by means of the collar, then fastened to the pipe with axial offset relative to the electrofusion tape, whereby the electrofusion tapes restrict possible pipe displacement and expansion, since these rest against the axially offset fixed-point fastening.

This object is also achieved according to the invention in that the heating element with the contact elements arranged therein and the jacket element are produced by extrusion and the heating element and the jacket element are fitted together after extrusion or in that the heating element with the contact elements arranged therein and the jacket element are co-extruded together.

All possible configurations can be combined freely together and also the features of the method and use are applicable to the electrofusion tape itself and vice versa.

BRIEF DESCRIPTION OF THE DRAWINGS

Exemplary embodiments of the invention are described with reference to the figures, the invention not being limited solely to the exemplary embodiments. In the figures.

DESCRIPTION OF THE PREFERRED EMBODIMENTS

Figure 1:
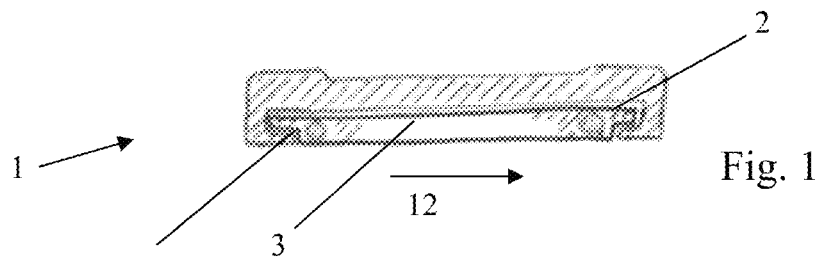
FIG. 1 shows a cross-section through an electrofusion tape according to the invention.
Figure 2:
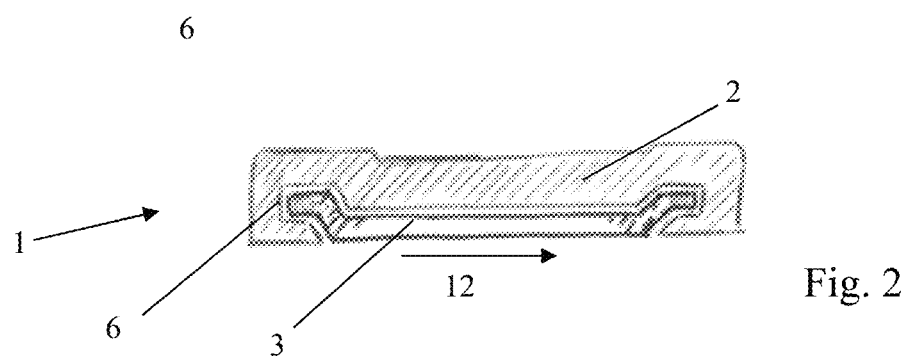
FIG. 2 shows a cross-section through an electrofusion tape according to the invention.
Figure 3:
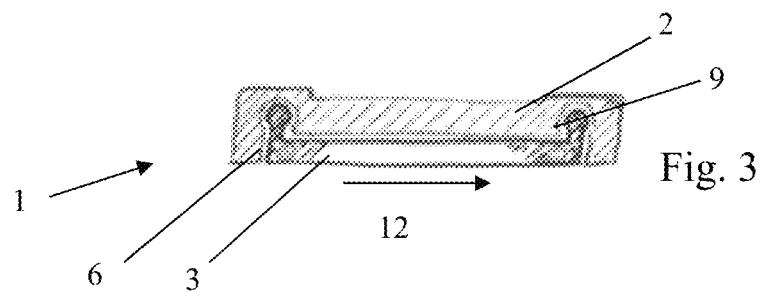
FIG. 3 shows a cross-section through an electrofusion tape according to the invention.

FIGS. 1-3 show cross-sections of an electrofusion tape 1 according to the invention each with different shapes of the connection configuration or of the wraparound guide which serves to ensure that the heating element 3 is guided at the sides and the top and bottom in the jacket element 2 and cannot readily or independently become detached from the jacket element 2. FIG. 1 shows a wraparound guide which takes the form of a T-slot guide. This enables displacement of the heating element 3 in the jacket element 2 along the length of the tape 5 but prevents lateral and also relative upwards and downwards displacement and independent mutual separation of the two elements 2, 3. The possibility of relative displacement of the elements 2, 3 along the tape length 5 allows the fusion tape 1 to be placed around any size pipe diameter since, due to the relative displacement, the fusion tape 1 is flexible or more bendable in application. A co-extruded electrofusion tape 1 suffers slight losses in flexibility or pliability with regard to its fusion of the jacket element 2 with the heating element 3, but due to the thin configuration of the elements good pliability is still present. FIG. 2 likewise shows a wraparound guide, the further figures also showing different possible configurations of such guides, wherein it goes without saying that still further configurations are possible.

In the cross-sections shown, the jacket element 2 encloses the heating element 3 at least in part. It goes without saying that complete enclosure is also conceivable, wherein the jacket element 2 is then preferably of thin configuration at the bottom of the heating element 3 in order to transmit the heat arising in the heating element 3 by thermal conduction rapidly through the jacket material to the tube and to fuse therewith.

The heating element 3 to this end comprises a conductive plastics material which allows current flow from one contact element 6 to another, whereby the heating takes place as well as fusing on and together of the plastics materials of the heating element 3, the jacket element 2 and the pipe on which the fusion tape 1 is fastened.

Since the current flow is achieved exclusively through the conductive plastics material and without additional wires or stranded wires apart from the contact element 6, the heating element 3 is not impaired in its flexibility, which is likewise of benefit to diameter-independent application and thus allows fastening whatever the diameter.

The contact elements 6 are arranged in the marginal region 4 of the heating element 3 and serve in supplying power to the heating element 3.

As a further alternative possible configuration, FIG. 3 shows anchors 9 which ensure mutual engagement of the heating element 3 and the jacket element 2.

As indeed with the other possible types of connection, there is also the possibility here of mutual displacement in the longitudinal direction 5 of the tape in that a generous gap is present in the jacket element 2 between anchor 9 and receiving contour, which as already mentioned ensures high tape 1 flexibility.

Figure 4:
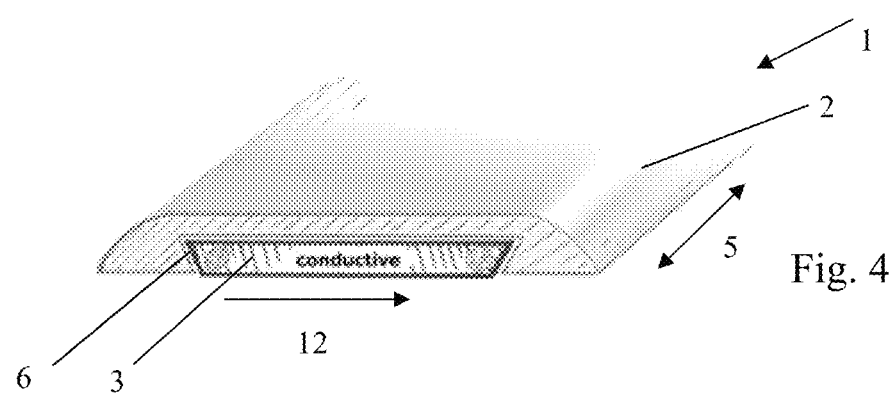
FIG. 4 is a three-dimensional view of an electrofusion tape according to the invention.

FIG. 4 shows a dovetail guide, and also that different configurations of the outer surface of the jacket element 2 may be present. That is to say, the outer face may for example be slightly recessed in the middle relative to the marginal regions, which may then serve as a limit stop in order to limit axial displacement or as a defined region for accommodating a tape or hook and loop tape which serves in mounting the electrofusion tape 1 prior to welding to the tube. It goes without saying that straight faces or other contours of the outer face of the jacket element 2 are also conceivable.

Figure 5:
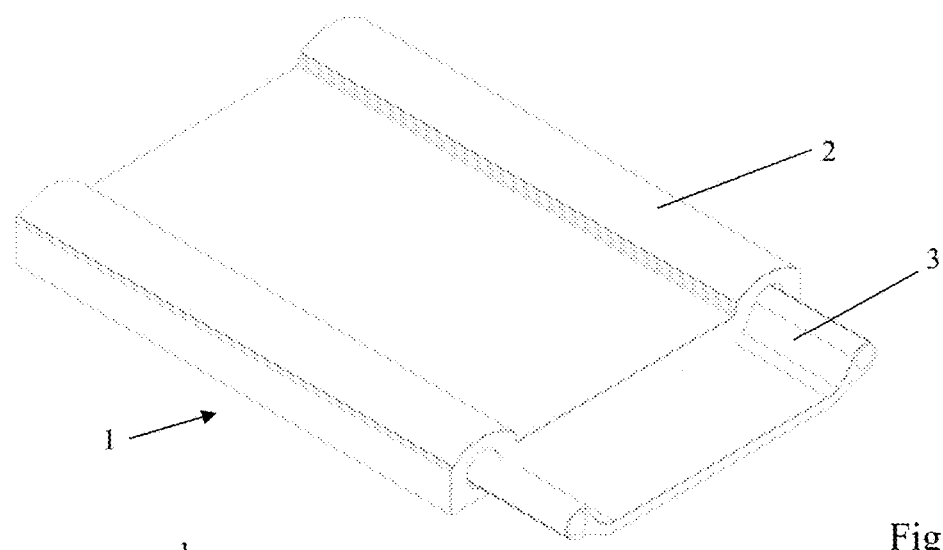
FIG. 5 is a three-dimensional view of an electrofusion tape according to the invention.

The fusion tape 1 is preferably produced by extrusion, wherein the electrofusion tape 1 may also be co-extruded and the heating element 3 and the jacket element 2 thereby fused together but, as already mentioned, they are here regarded as being of multipart construction also due to the different plastics compositions exhibited by the heating element and the jacket element. The contact element 6 or the contact elements 6 are likewise introduced during extrusion or co-extrusion. FIG. 5 shows a three-dimensional view of a fusion tape 1 according to the invention, wherein the heating element 3 projects slightly out of the jacket element 2 so it can be seen. The jacket element 2 and the heating element 3 are based on the same plastics material, preferably a thermoplastic, especially preferably a thermoplastic polyolefin.

It is additionally advantageous, if the pipe to which the fusion tape 1 is welded is based on the same plastics material.

Figure 6:
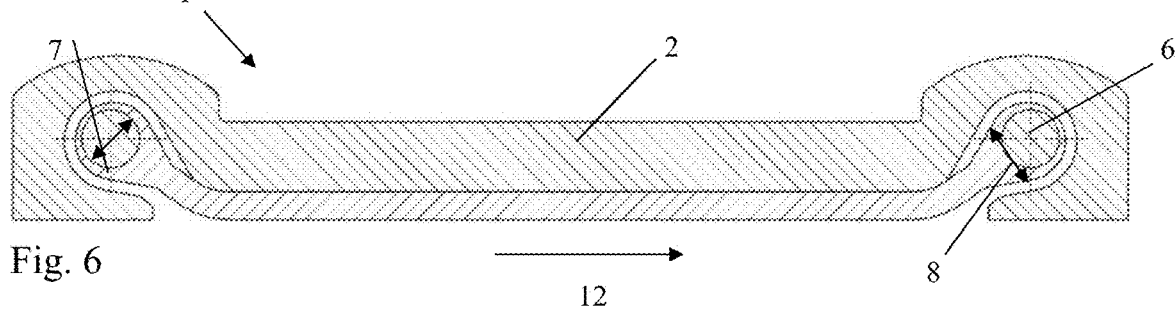
FIG. 6 shows a cross-section through an electrofusion tape according to the invention, wherein the contact element has a round cross-section
Figure 7:
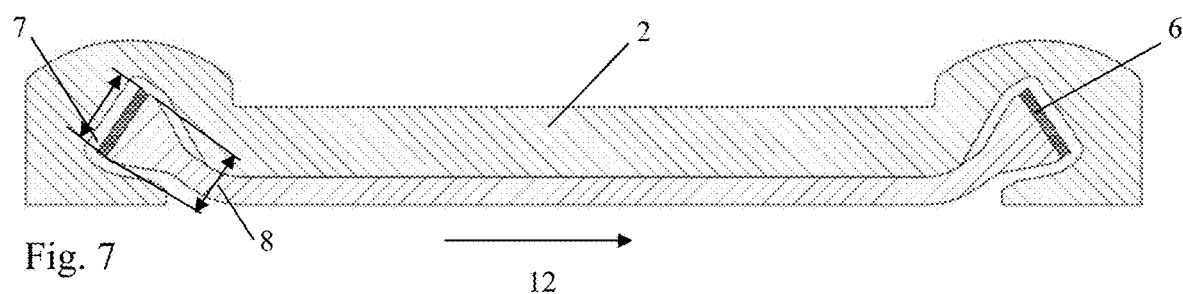
FIG. 7 shows a cross-section through an electrofusion tape according to the invention, wherein the contact element has an angular cross-section.

It has likewise proven advantageous for the width or diameter of the contact element 7, in cross-section, to be less than or equal to the thickness 8 of the heating element 3, which may be inferred from FIG. 6. The smaller or thinner is a region on the heating element 3, the higher is the power consumption there, and the more heat is generated. In order to ensure at this point, at the transition from the contact element 6 to the heating element 3, that the current flow 12 is provided or the heating element 3 is not overheated or melted through at the transition, as mentioned above the heating element 3 or the thickness 8 thereof is wider than or equal to the width of the contact element 6.

By varying the width of the heating element cross-section along the direction 12 of current flow, the heat generation in the corresponding regions is influenced and the temperature in the corresponding regions thereby adjusted or influenced. At points with a large or wide heating element cross-section, less power is consumed, whereby less heat is generated and the plastics material is melted to a correspondingly lesser extent or with a greater delay, while regions of the heating elements 3 with a smaller or thinner cross-section generate large amounts of thermal energy and the plastics material is melted strongly or quickly there.

In this way, for example, marginal regions 4 or other regions in which melting is undesirable or should proceed only to a slight degree or with a delay, may be correspondingly wide.

Figure 8:
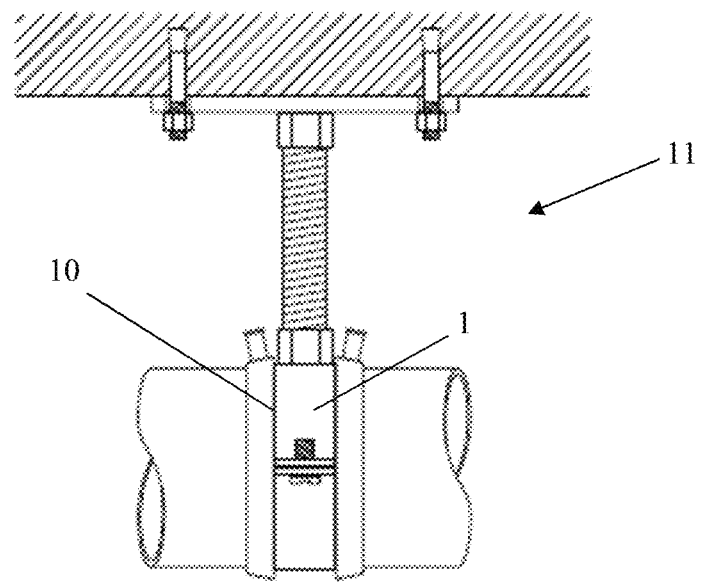
FIG. 8 is a view of a possible fixed-point fastening in which the fixed-point fastening surrounds the electrofusion tape and FIG. 9 is a view of a possible fixed-point fastening in which the fixed-point fastening is arranged axially offset.
Figure 9:
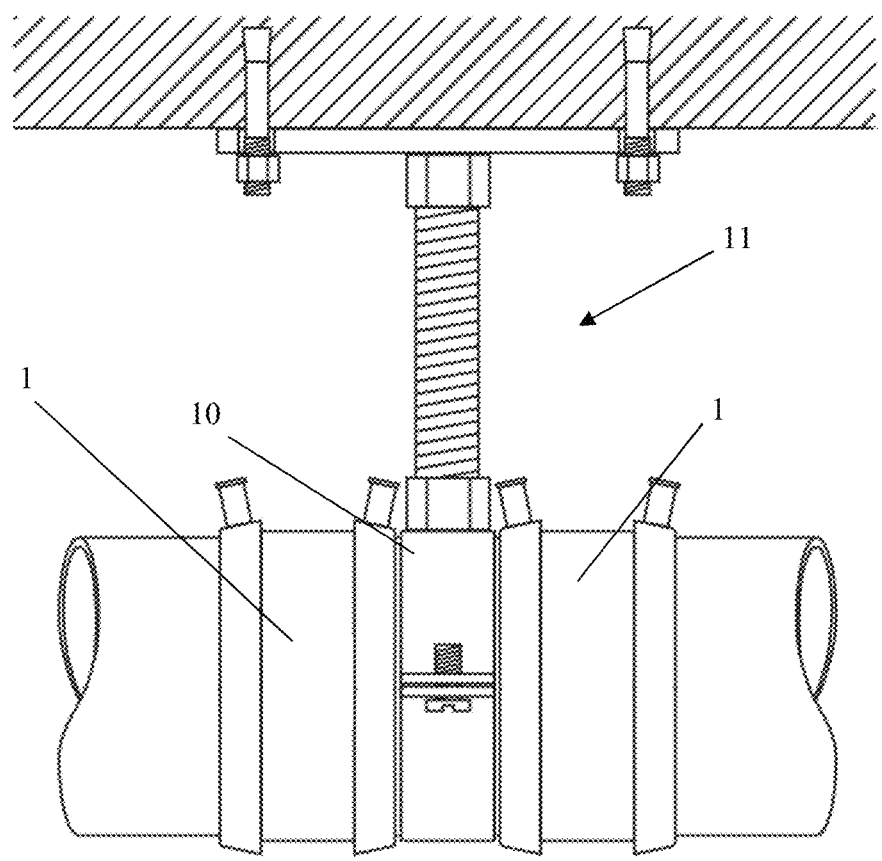

FIG. 8 shows a preferred application of an electrofusion tape 1 according to the invention as a component part of a fixed-point fastening 11. The embodiment illustrated shows a pipe clamp 10, which is placed around the electrofusion tape 1. Through the configuration of the jacket element 2 of the electrofusion tape 1, which is thicker in the marginal regions, displacement in the axial direction of the pipe is limited. Alternatively, a fixed-point fastening is also conceivable which is fastened between two electrofusion tapes 1 welded onto the pipe which serve as limit stops, as illustrated in FIG. 9.

The invention claimed is:

1. An electrofusion tape for welding plastics pipes comprising a jacket element of an electrically insulating plastics material, at least one heating element of electrically conductive plastics material and at least two contact elements for supplying electricity to the heating element, wherein the jacket element and the heating element take the form of tapes, wherein the jacket element surrounds the heating element at least in part, wherein the contact elements are arranged in mutually opposing marginal regions of the heating element and extend parallel to one another along the heating element wherein the heating element is displaceable neither sideways nor transversely of the longitudinal direction of the tape, the heating element being arranged so as to be displaceable in the jacket element solely in the longitudinal direction of the tape or in the case of coextrusion of the jacket and heating elements, displacement in the longitudinal direction is also prevented, since the two elements fuse together in the contact region, and wherein the jacket element is in the form of a dovetail guide or T-slot guide.

2. The electrofusion tape according to claim 1, wherein the specific conductivity of the contact elements is higher than the specific conductivity of the heating element.

3. The electrofusion tape according to claim 1, wherein the heating element of electrically conductive plastics material has a specific electrical resistance of 0.1-100 [Ω×cm], preferably of 0.1-10 [Ω×cm].

4. The electrofusion tape according to claim 1, wherein the contact elements are made of copper or of endless carbon fibre or of an electrically conductive plastics compound with carbon nanotubes, graphite, graphene or with a metallic filler.

5. The electrofusion tape according to claim 1, wherein the contact elements take the form of wire or wire braid.

6. The electrofusion tape according to claim 1, wherein the jacket element and the heating element are the same grade of plastics material.

7. The electrofusion tape according to claim 1, wherein the heating element is arranged form-fittingly in the jacket element.

8. The electrofusion tape according to claim 1, wherein the electrofusion tape has a wraparound guide or is configured as such and the heating element is guided by the jacket element, wherein the heating element is gripped around at least in part by the jacket element.

9. The electrofusion tape according to claim 1, wherein in the cross-section of the electrofusion tape the width or diameter of the contact element is less than or equal to the thickness of the heating element in the region of the contact face between contact element and heating element.

10. The electrofusion tape according to claim 1, wherein the heating element has anchors for connection with the jacket element.

11. An electrofusion tape for welding plastics pipes comprising:
   a jacket element of an electrically insulating plastics material,
   at least one heating element of electrically conductive plastics material,
   at least two contact elements for supplying electricity to the heating element,
   the jacket element being a plastic tape having an inner side, an outer side and a slot in the inner side, the slot having side walls and defining an opening in the inner side,
   the heating element being a plastic tape and being located in the slot, and
   the slot and heating element being configured to substantially prevent displacement of the heating element sideways and transversely to a longitudinal direction of the tape, while presenting the heating element outside of the jacket toward an inner side of the tape.

12. The electrofusion tape of claim 11 wherein the contact elements are arranged in mutually opposing marginal regions of the heating element and extend parallel to one another along the heating element.

13. The electrofusion tape of claim 12 wherein the slot is a dovetail guide or a T-shaped guide.

* * * * *